United States Patent [19]

Hageman

[11] Patent Number: 5,240,303
[45] Date of Patent: Aug. 31, 1993

[54] AUTOMATIC TARP APPARATUS

[76] Inventor: Richard J. Hageman, 7956 159th Lane NW., Ramsey, Minn. 55303

[21] Appl. No.: 884,953

[22] Filed: May 18, 1992

[51] Int. Cl.⁵ .............................................. B60P 7/04
[52] U.S. Cl. ...................................... 296/98; 296/100
[58] Field of Search ................... 296/100, 98; 160/327, 160/84.1

[56] References Cited

U.S. PATENT DOCUMENTS

| | | |
|---|---|---|
| 2,591,186 | 4/1952 | Neitzke . |
| 2,594,910 | 4/1952 | Germann . |
| 3,366,414 | 1/1968 | Thompson et al. ................. 296/100 |
| 3,498,666 | 3/1970 | Harrawood . |
| 3,774,958 | 11/1973 | Thorpe . |
| 3,854,770 | 12/1974 | Grise et al. . |
| 3,977,719 | 8/1976 | Thurston . |
| 4,030,780 | 6/1977 | Petretti . |
| 4,050,734 | 9/1977 | Richard . |
| 4,088,170 | 5/1978 | Franklin .............................. 160/84.1 |
| 4,189,178 | 2/1980 | Cramaro ......................... 296/100 X |
| 4,944,551 | 7/1990 | Hardy ................................... 296/100 |
| 5,004,032 | 4/1991 | Pedersen ........................ 296/100 X |
| 5,064,240 | 11/1991 | Kuss et al. ........................... 296/100 |

Primary Examiner—David M. Mitchell
Assistant Examiner—Gary C. Hoge
Attorney, Agent, or Firm—Burd, Bartz & Gutenkauf

[57] ABSTRACT

A tarp apparatus operated from the cab of a vehicle has a tarp that is automatically moved to open and close the open top of a vehicle box. The tarp mounted on a pair of rails is moved with cables and pulleys powered with a motor driven shaft to open and closed positions. Lift units connected to the rails operate to move the rails and tarp to up and down positions relative to the vehicle box to allow the tarp to be freely moved to its open and closed positions.

23 Claims, 11 Drawing Sheets

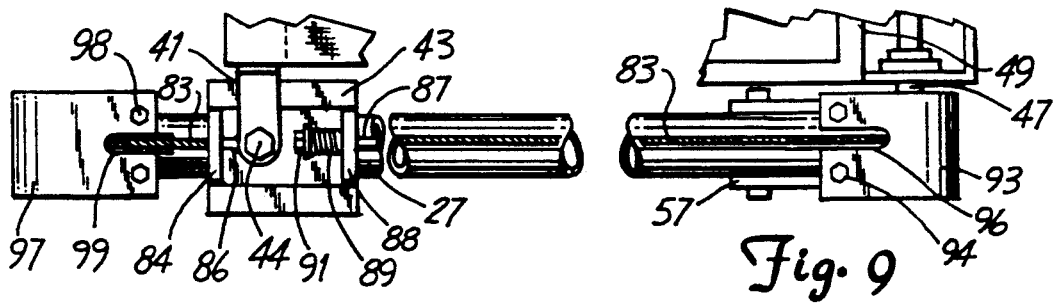
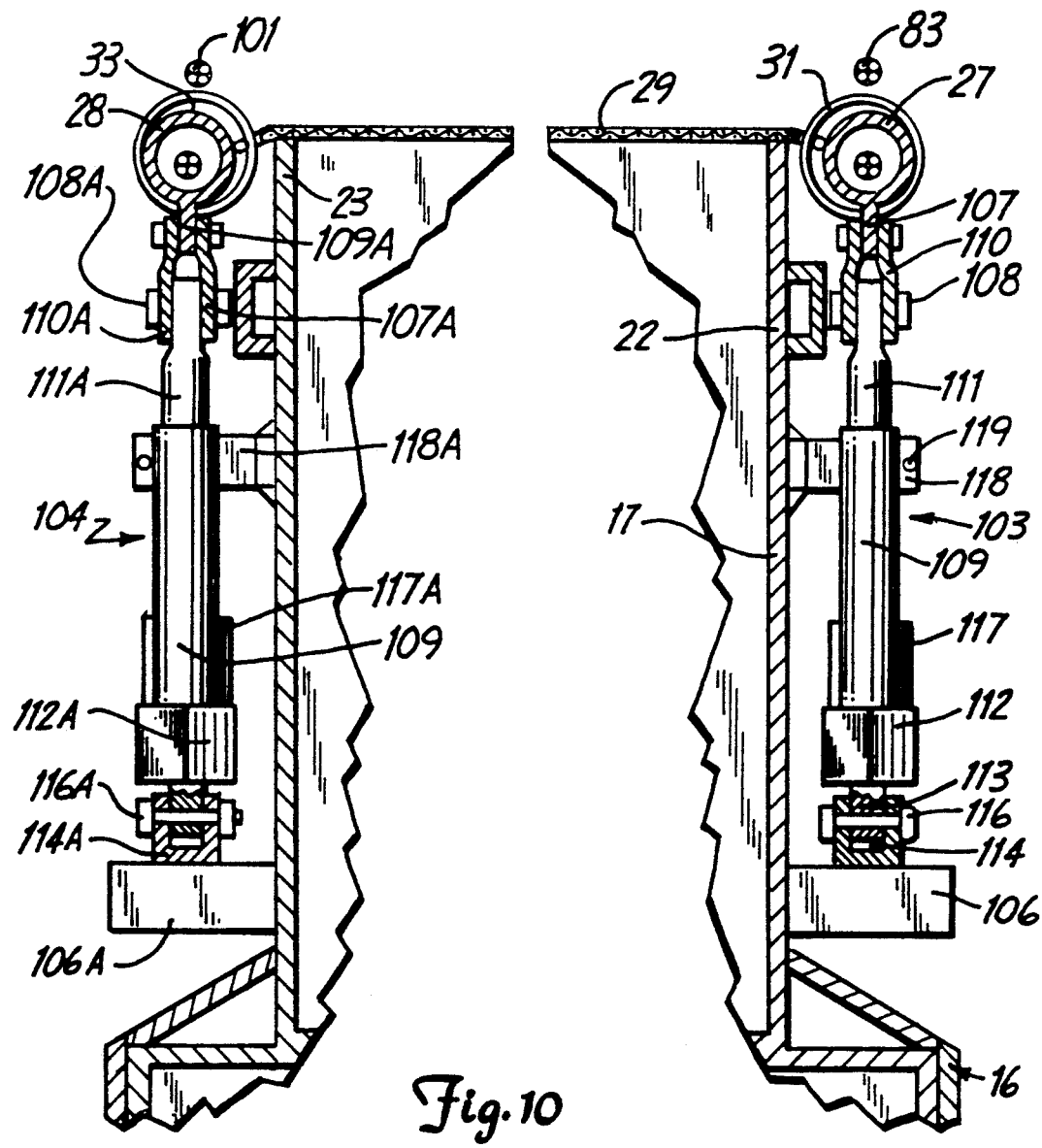

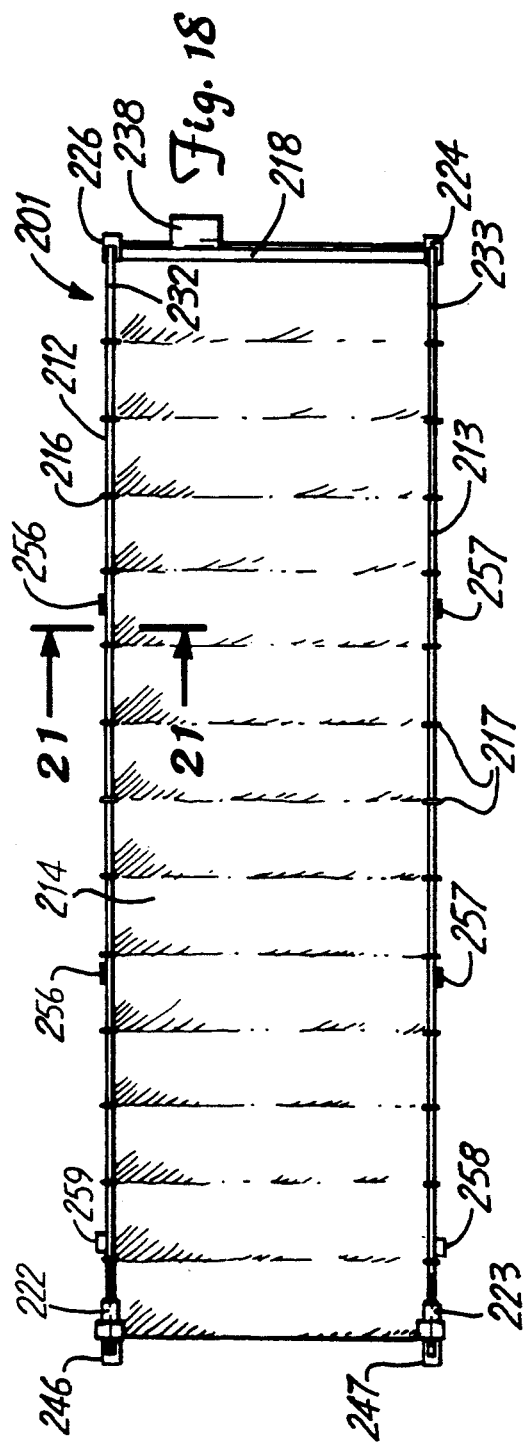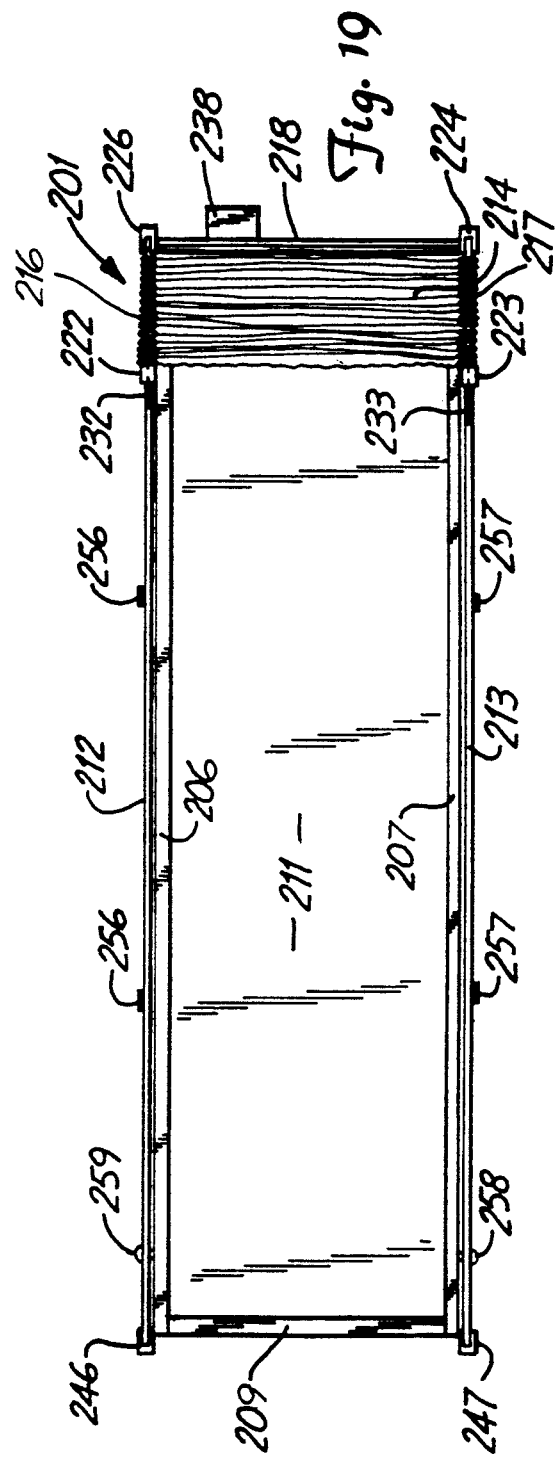

AUTOMATIC TARP APPARATUS

FIELD OF INVENTION

The invention is in the field of truck box and trailer covers for protecting cargos and bulk materials during storage and transit The covers are automatic operated tarps that open and close the tops of truck boxes and trailers.

BACKGROUND OF INVENTION

Truck box covers are used to protect loads that are susceptible to damage from water, fumes, wind, snow and other environmental elements encountered during storage and transit. Covers are also used to prevent loads including sand, dirt, gravel and wood chips falling out onto the roads and adjacent vehicles. Dump truck covers are desirable to prevent dirt, gravel, sand or refuse from falling onto the road or vehicles which often suffer cracked windshields and chipped paint. A number of states in the United States of America and Europe and Canadian provinces have laws that require truck boxes and trailers to be covered during transit.

The operators of the trucks have the job of opening and closing the covers. Covers with hand cranks require considerable time and effort to operate and are at locations that are not readily accessible Examples of a hand crank drive for a truck cover is disclosed by H. E. Thurston in U.S. Pat. No. 3,977,719. The truck operators must leave the cabs of the trucks to close and open the covers or have assistants to open and close the covers. Power operated truck box covers have been developed to reduce the time and labor required to open and close the covers. D. B. Richard in U.S. Pat. No. 4,050,734 uses hydraulic cylinders to swing an inverted U-shaped bar pivoted to the sides of a truck to carry a cover between open and closed positions When the cover is in the closed position the load is not totally enclosed within the truck so that material can fall out onto the road or hit a vehicle.

SUMMARY OF INVENTION

The invention is a tarp apparatus for a vehicle box that is power driven between open and closed positions to confine the load to the box to protect the load from the external environment and prevent debris, including part of the load, from falling out in transit. The tarp apparatus has a tarp that is moved between open and closed positions by the vehicle operator from a location remote from the tarp, such as the cab of a truck.

The tarp apparatus is employed with a box having upright sidewalls, an open top, and a chamber for accommodating a load, such as bulk materials. A pair of rails located adjacent upper portions of the sidewalls have front ends mounted on a transverse shaft. The shaft is rotatably mounted on the front of the box. A motor, such as a DC electric motor, drivably connected to the shaft is selectively operable to turn the shaft to move a tarp along the rails to open and closed positions relative to the open top of the box. The tarp is connected to slides carried by the rails The slides guide the tarp for movement in the linear direction of the rails and are connected to cables trained about drive pulleys secured to the shaft. Rotation of the shaft by operation of the motor causes the slides to move along the rails to move the tarp between the open and closed positions. Lift units connected to the box and rear portions of the rails operate to move the rails to up positions above the top of the box and down positions adjacent the outsides of the sidewalls of the box. When the rails are in the up positions the tarp can be moved without interference from the load, including a dump load, to its closed position. When the rails are in the down positions they hold the tarp against the top of the sidewalls of the box and confine the load to the box chamber. The lift units include linear actuators that have electric motors operated with switches located within the cab of the vehicle. The operator of the vehicle controls the motor for moving the tarp and the motors for moving the rails up and down from within the vehicle cab. The entire covering and uncovering operation of the vehicle box is achieved without the vehicle operator leaving the cab.

A modification of the tarp apparatus is used on a long open top trailer having upright side walls joined to a transverse front wall for confining material to the cargo chamber of the trailer. The tarp apparatus has a pair of rails extended along upper portions of the side walls and supporting a foldable tarp. A tarp moving apparatus operates to move the tarp to open and closed positions relative to the open top of the box. The tarp moving apparatus has a shaft rotatably mounted on a support connected with first left units to the front wall. The rails are mounted on opposite ends of the shaft. A motor mounted on the support drives the shaft which pulls cables connected to the tarp with slides movably mounted on the rails to move the tarp between its open and closed positions. Second lift units mounted on the side walls of the trailer are connected to the rails. A control, such as electric switches, located in the cab of the truck tractor is used to operate the lift units to raise and lower the rails and move the tarp between its open and closed positions. The entire covering and uncovering of the trailer with the tarp is achieved without the truck operator leaving the safety of the cab of the truck.

DESCRIPTION OF DRAWING

FIG. 9 is a foreshortened sectional view taken along the line 9—9 of FIG. 8;

FIG. 10 is an enlarged foreshortened sectional view taken along the line 10—10 of FIG. 8;

FIG. 18 is a top plain view of a trailer having a box equipped with a modification of the automatic tarp apparatus of the invention in the closed position;

FIG. 19 is a top plain view of the trailer of FIG. 18 showing the tarp apparatus in the open position;

DESCRIPTION OF PREFERRED EMBODIMENTS

Figure 1:
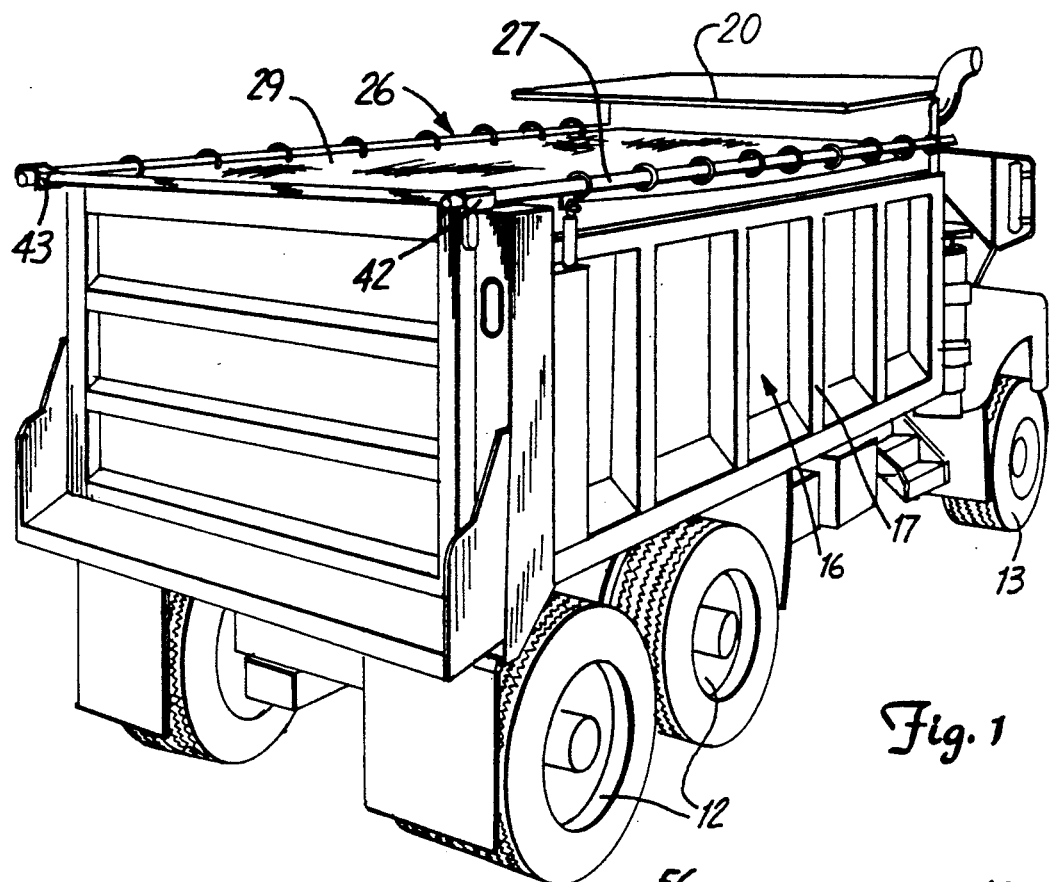
FIG. 1 is a rear perspective view of a truck having a box equipped with the automatic tarp apparatus of the invention.
Figure 2:
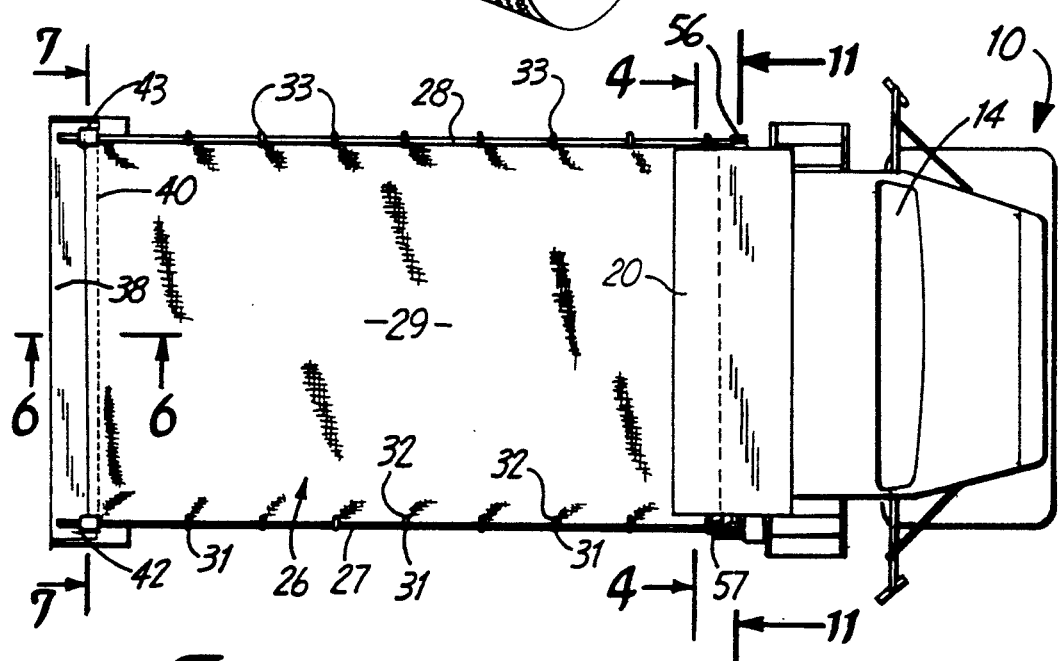
FIG. 2 is a top view of the truck of FIG. 1 showing the tarp apparatus in the closed position.
Figure 3:
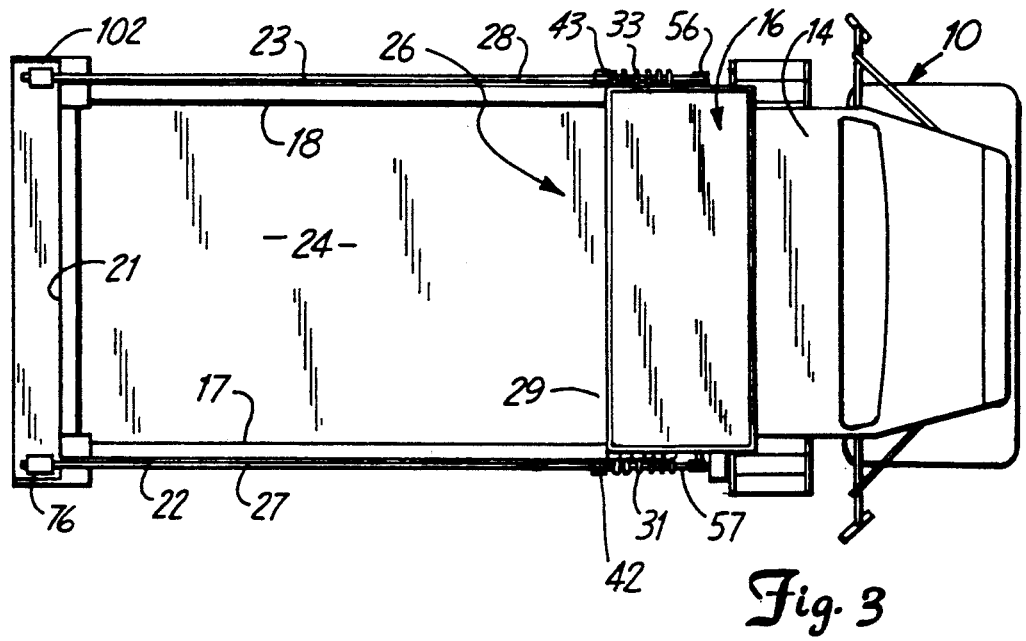
FIG. 3 is a top view of the truck of FIG. 1 showing the tarp apparatus in the open position.
Figure 4:
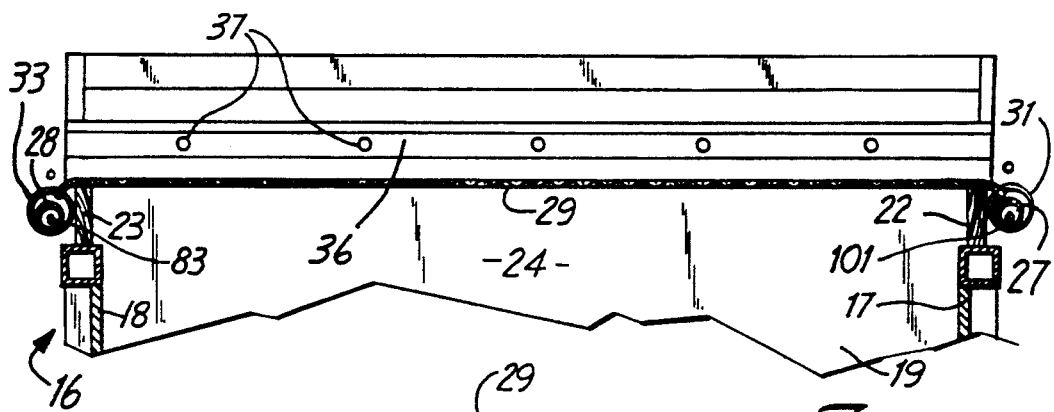
FIG. 4 is an enlarged sectional view taken along the line 4—4 of FIG. 2.

Referring to the drawing, there is shown in FIGS. 1 to 3, a conventional material handling and hauling truck, indicated generally at 10, used to haul bulk materials, such as rocks, gravel, sand, road materials, building debris, soil, lime, grain and the like. Truck 10 has a longitudinal frame supporting rear drive wheels 12 and front steering wheels 13. The forward portion of frame supports a truck driver or operators cab 14. A large open top box or body 16 is mounted on frame behind cab 14. Truck 10 can be equipped with a hoist used to raise box 16 in an upwardly direction to dump the material contained in the box into a desired location As shown in FIG. 4, box 16 has generally upright metal side walls 17 and 18 joined to a transverse front wall 19. Front wall 19 is located immediately behind truck operators cab 14. The opposite end of box 16 has a rear gate 21 which is normally latched in a closed position with a latching mechanism (not shown). When the latching mechanism is released gate 21 can swing to an open position to allow the material to be dumped from the box into a desired location. Longitudinal side boards 22 and 23 are mounted on the top of side walls 17 and 18 to increase the load capacity and protect tops of side walls 17 and 18. Box 16 has a relatively large rectangular chamber or space 24 for accommodating a load of bulk material.

An automatic tarp apparatus indicated generally at 26 is a structure used to selectively cover or uncover the open top of box 16 as shown in FIGS. 2 and 3. When tarp apparatus 16 is in the open position, as shown in FIG. 3, bulk material can be placed into the open top of box 16. The automatic tarp apparatus 26 is a power operated cover structure that is controlled by the operator of the truck from within cab 14. The entire opening and closing operations of tarp assembly 26 is under the control of the truck operator within cab 14. This enhances the safety of the truck operator. When the tarp apparatus 26 is in the closed position the entire top of the box is closed. The tarp is draped over side boards 22 and 23, shown in FIG. 4, to minimize the escape of material from chamber 24 of the box.

Figure 5:
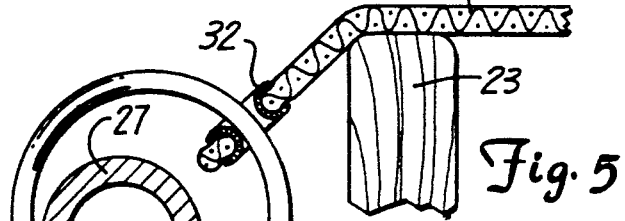
FIG. 5 is an enlarged sectional view taken along the line 5—5 of FIG. 2.

Tarp apparatus 26 has a pair of rails or arms 27 and 28 that are located longitudinally adjacent the tops of side walls 17 and 18 of box 16. Rails 27 and 28 are linear pipes or tubular members that movably support a tarp 29. Tarp 29 can be a canvas sheet, or a sheet of plastic or rubberized material having dimensions greater than the longitudinal and transverse dimensions of the open top of box 16. Tarp 29 is a flexible sheet material cover made of PVC coated nylon or polyester fabrics or rubber coated fabric. The opposite side edges of tarp 29 are slideably supported on rails 27 and 28 to allow tarp 29 to be extended to the closed position as shown in FIG. 2 and moved therefrom to an open position as shown in FIG. 3. A plurality of connectors or metal rings 31, as stainless steel rings, surround arm 27. As shown in FIG. 5, each ring 31 extends through a grommet 32 secured to an edge of tarp 29. A plurality of metal, such as stainless steel, rings 33 are located about arm 28. Each ring 33 extends through a grommet (not shown) attached to the longitudinal side edge of tarp 29. Rings 31 and 33 can be attached to opposite sides of tarp 29 with webbing stitched to tarp 29. Other structures can be used to secure rings 31 and 33 to tarp 29. The front transverse edge of tarp 29 is located adjacent the front wall on 19. Returning to FIG. 4, a transverse plate 36 accommodating fasteners 37, such as bolts, is used to hold the front transverse edge of tarp 29 in fixed engagement with the top transverse edge of front wall 19.

Figure 6:
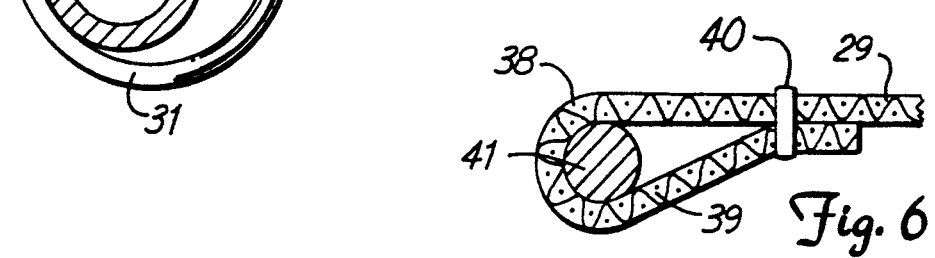
FIG. 6 is an enlarged sectional view taken along the line 6—6 of FIG. 2.
Figure 7:
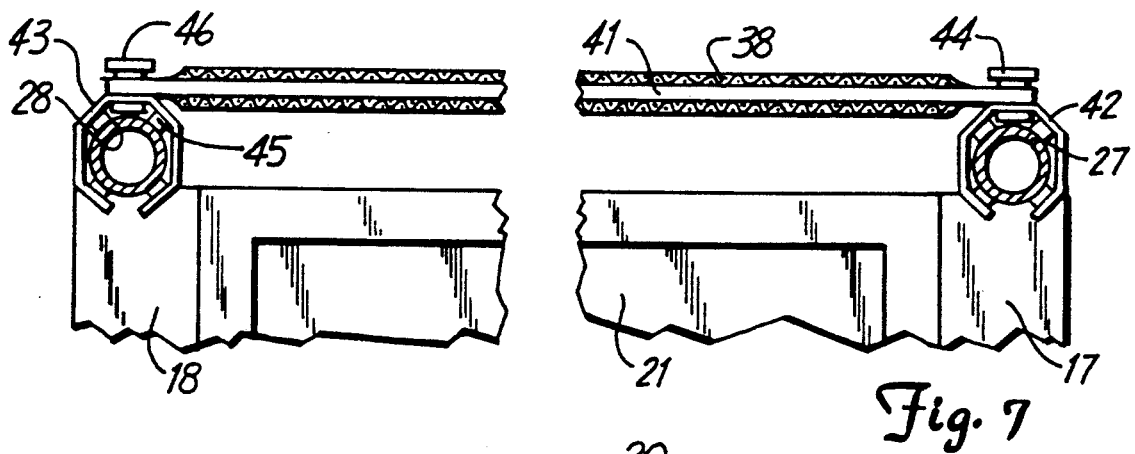
FIG. 7 is an enlarged foreshortened sectional view taken along the line 7—7 of FIG. 2.

As shown in FIGS. 6 and 7, the rear edge of 38 of tarp 29 has a transverse loop 39 and stitches 40 providing a transverse passage accommodating a transverse rod 41. Opposite ends of rod 41 are secured to slides 42 and 43 with connectors or bolts 44 and 46 respectively. Slides 42 and 43 are generally inverted U-shaped members that fit over arms 27 and 28 and slide along the arms as hereinafter described. Each slide 42 and 43 has a plurality of plastic pads or blocks 45 secured to the inside surfaces thereof to facilitate movement of the slides along arms 27 and 28. Alternatively, a single high density plastic block or a coating of plastic can be used with each slide 42 and 43 to facilitate sliding movement of slides 42 and 43 along arms 27 and 28.

Figure 8:
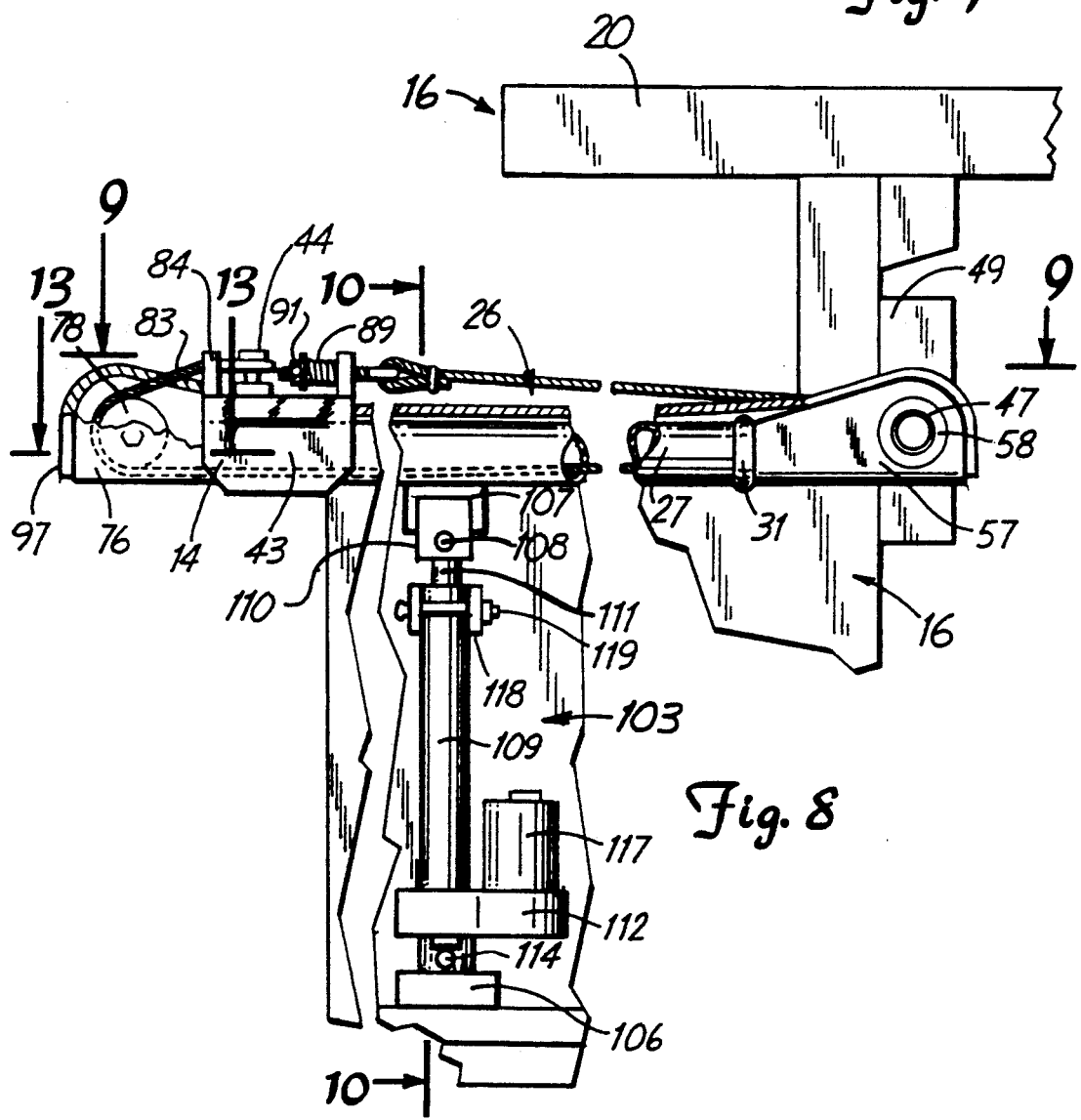
FIG. 8 is a foreshortened enlarged side elevational view of the automatic tarp apparatus in the closed position as shown in FIG. 2.
Figure 11:
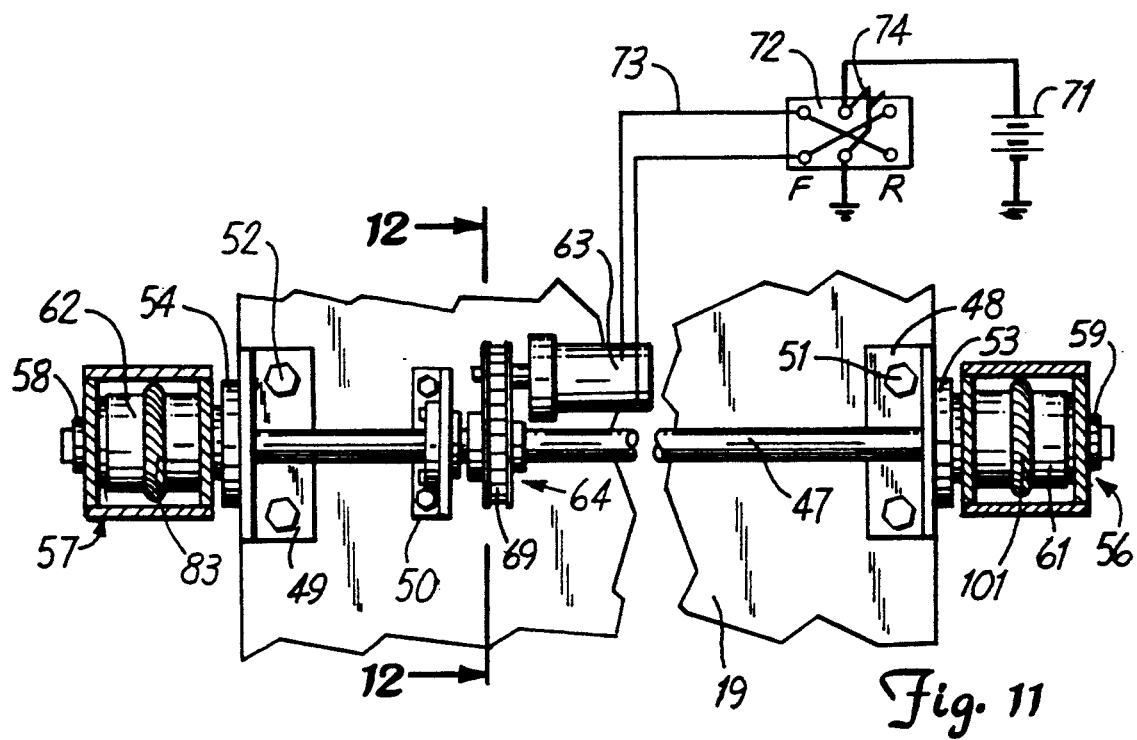
FIG. 11 is an enlarged foreshortened sectional view taken along the line 11—11 of FIG. 2.

As shown in FIG. 11, a transverse shaft 47 is located forwardly of front wall 19. Opposite ends of shaft 47 extend through brackets 48 and 49 that are secured with bolts 51 and 52 to front wall 19. Bearings 53 and 54 rotatably mount shaft 47 on brackets 48 and 49. Additional brackets and bearings 50 rotatably support mid-sections of shaft 47 on front wall 19. Shaft 47 has opposite outer ends that extend outwardly from brackets 48 and 49. A first connector 56 is mounted on one end of shaft 47. A similar second connector 57 is mounted on the opposite end of shaft 47. Each connector has a U-shaped member that is secured to the forward end of an arm. As shown in FIG. 8, connector 57 is secured to forward end of arm 27. Bearing 58 mounted on connector 57 rotatably support the connector on shaft 47. Similar bearings 59 on connector 56 rotatably support arm 28 on shaft 47.

Figure 12:
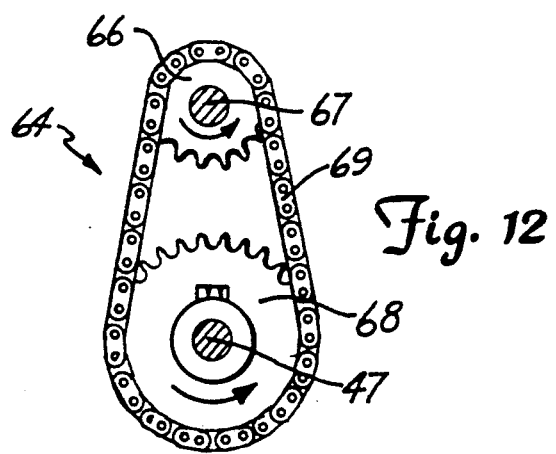
FIG. 12 is an enlarged sectional view taken along the line 12—12 of FIG. 11.

A first drive pulley or spool 61 is located within connector 56 and secured to shaft 47 with a drive pin (not shown). The opposite connector 57 accommodates a second drive pulley or spool 62 secured to shaft 47 with a drive pin (not shown). Spools 61 and 62 rotate with shaft 47. An electric reversible DC motor 63 mounted on front wall 19 drivably connected to shaft 47 with a power transmission 64. As shown in FIG. 12, power transmission 64 has a chain and sprocket drive comprising a drive sprocket 66 mounted on motor shaft 67. Drive sprocket 66 is aligned with a driven sprocket 68 mounted on shaft 47. An endless roller chain 69 drivably connects sprockets 66 and 68. Motor 63 has gear head 67 connected to sprocket 66. Motor 63 is connected to battery 71 of the vehicle with a switch 72 located within cab 14. An electrical conductor line or cable 63 connects switch 72 to motor 63. Switch 72 has an actuator 74, shown as a handle, that can be moved from an upright neutral position or a reverse position Switch 72 is used to change the direction of rotation of motor 63 and thereby selectively change the direction of rotation of the shaft 47, so as to move tarp 29 between its open and closed positions.

Figure 13:
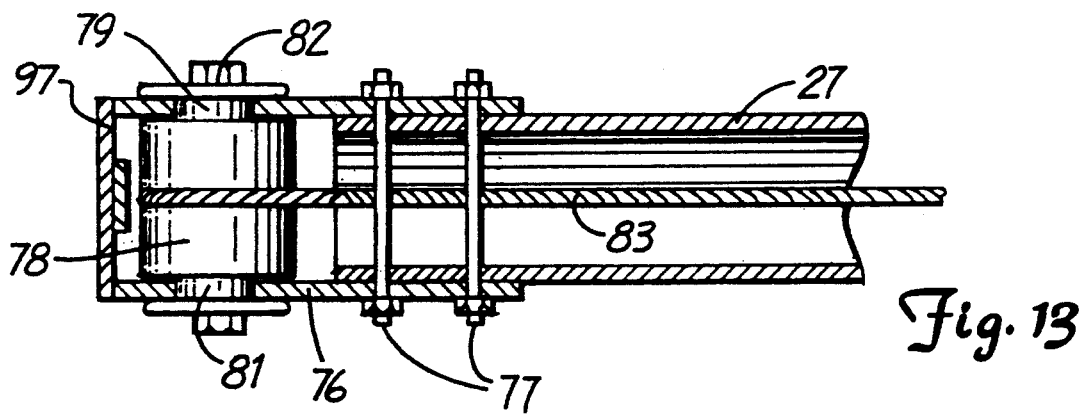
FIG. 13 is an enlarged sectional view taken along the line 13—13 of FIG. 8.

Referring to FIG. 13, a U-shaped member 76 is secured to the rear end of arm 27 with a pair of bolts 77. An idler pulley or spool 78 is interposed between the sides of U-shaped member 76 and rotatably mounted thereon with a pair of bearings 79 and 81. A transverse bolt 82 holds the bearings and spool 78 in assembled relation on member 76. A cable 83 having a run located within the passage of arm 27 is trained about idler spool 78. The opposite end of cable 83 is located about drive pulley or spool 62, as seen in FIG. 11. Cable 83 terminates in a loop 86 that is attached to fastener 44. The opposite end of cable 83 has an elongated threaded rod 87 that extends through ear 88 of bracket 84 and a coil spring 89. A nut 91 threaded onto the rod 87 compresses spring 89 to maintain cable 83 in tension.

As shown in FIGS. 8 and 9, a generally curved cover 93 fits over connector 57 and is attached thereto with a plurality of bolts 96. Cover 93 has a longitudinal central slot 96 that serves as a guide for cable 83 and maintains the forward end of cable 83 on drive spool 62. Slot 94 is longitudinally aligned with a central groove in spool 62. Second cover 97 fits over the top of U-shaped member 76 and is secured thereto with a plurality of bolts 98. Cover 97 has a longitudinal slot 99 that maintains cable 83 in the center of idler spool 78.

Arm 28 accommodates cable 101 that is trained about drive pulley or spool 61. The opposite end of cable 101 is located about a spool arm 28. Member 102 and spool 61 therein have the same structure as member 76 and spool 78 in FIG. 13. Rails 27 and 28 are simultaneously raised and lowered with a pair of lift units 103 and 104, shown in FIG. 10. Lift units 103 and 104 are linear extendible and contractible mechanisms operable to selectively raise and lower arms 27 and 28 and tarp 29 carried thereby. Units 103 and 104 can be air or hydraulic fluid operated piston and cylinder assemblies, electric motor operated linear actuators, or hand crank screws. Other types of lift units can be used to raise and lower arms 27 and 28. Lift units 103 and 104 are identical in structure and operation. A support 106 secured to side wall 17 anchors lift unit 103 on the outside of wall 17. Arm 27 has downwardly directed plate or rib 107 that accommodates a bracket 110 and a pin 108 that attaches the upper end of lift unit 103 to arm 27. Lift unit 103 is a linear actuator having an elongated upright tubular body 109 accommodating a rod 111. The rod 111 is adapted to move into and out of body 109 thereby selectively extend or retract lift unit 103. Body 109 is mounted on a base 112 having a downwardly directed foot 113. Foot 113 fits within the U-shaped bracket 114 that is attached to the top of support 106. Pin or bolt 116 pivotly connects foot 113 to bracket 114. Base 112 supports an electric motor that is drivably connected to the operating mechanism of lift unit 103. An example of a usable linear actuator is the electro-mechanical linear actuator made by the Warner Electric Brake and Clutch Company, South Beloit, Ill. Lift unit 104 is identical to lift unit 103. The parts of lift unit 104 that correspond to the part of lift unit 103 have the same reference numbers with the suffix A.

The upper end of body 109 is maintained in vertical alignment with the arm 27 with bracket or holder 118. Bolt 119 secures bracket 118 to body 109. Bracket 118 is attached to side wall 17 of the truck box.

Figure 14:
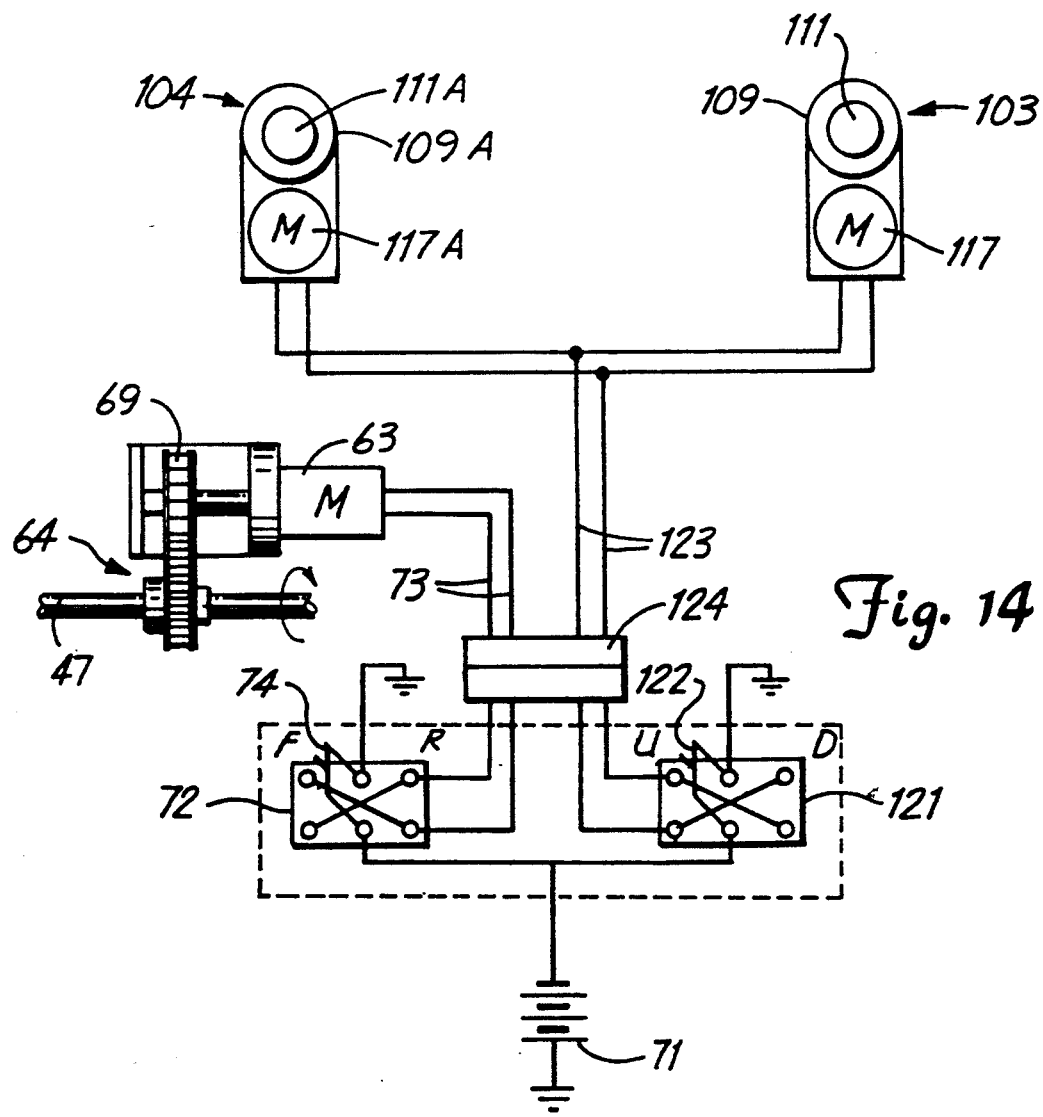
FIG. 14 is a diagramatic view of the electrical and mechanical controls for the automataic tarp apparatus of the invention.

Referring to FIG. 14, motors 117 and 117A are connected with a conductor line 123 to a switch 121. Switch 121 is located within cab 14 of the truck so that it can be operated by the operator. Switch 121 has an actuator handle 122 that is movably from an upright neutral to a forward up position and a rear down position. Switch 121 operates to control drive direction operation of motors 117 and 117A thereby controlling the up and down movements of lift units 103 and 104 and tarp 29 carried by rails 27 and 28.

In use tarp apparatus 26 is in the open position as shown in FIG. 3 to allow the load to be placed in box 16. The operator located within the safety of vehicle cab 17 moves switch 72 in the forward direction to fold the tarp in the open position, as shown in FIG. 3. Motor 63 is operated to turn shaft 47 thereby rotate drive spools 61 and 62 to pull cables 83 and 101 to move slides 42 and 43 in forward direction along rails 27 and 28. Tarp 24 folds under cab shield 20. Arms 27 and 28 are then moved to lower positions adjacent the outsides of box 16 below the top edges thereof. This location of arms 27 and 28 protects the arms and cables 83 and 101 from material loading equipment and the material dumped into box 16.

Figure 15:
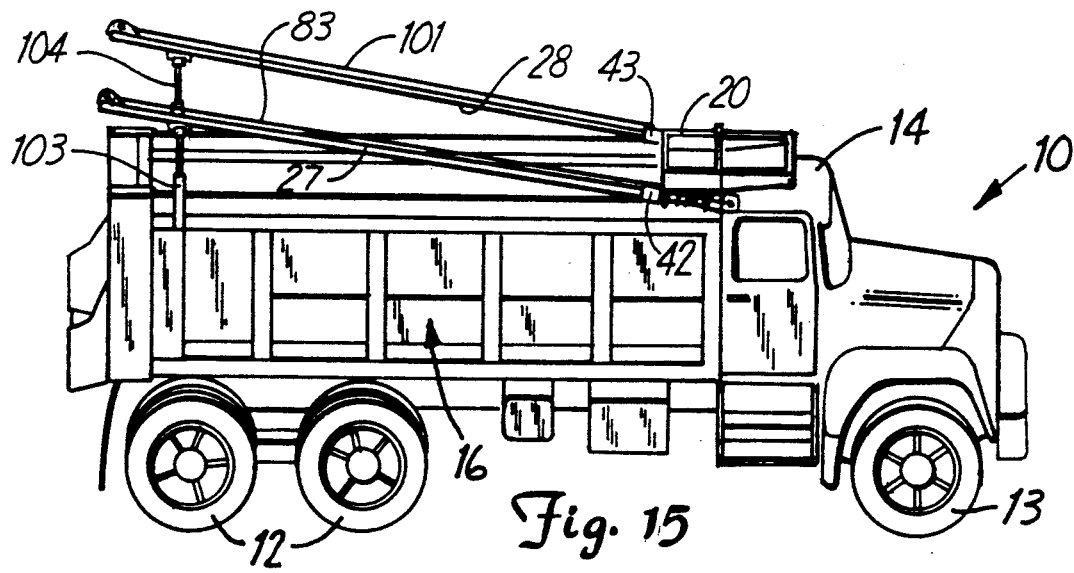
FIG. 15 is a side elevational view of the truck of FIG. 1 showing the tarp carrier rails of the automatic tarp apparatus in the raised position with the tarp in the open position.
Figure 16:
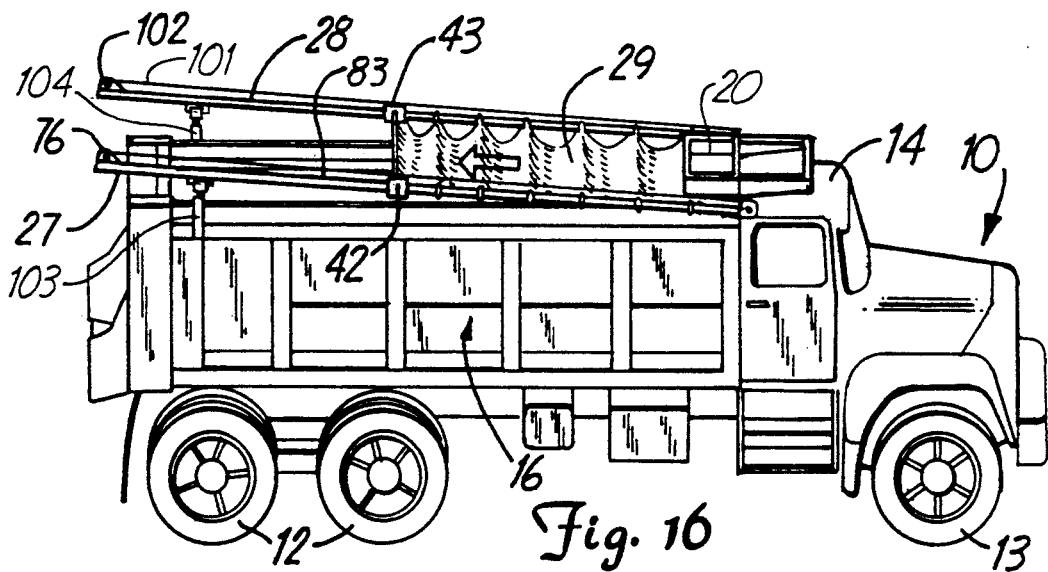
FIG. 16 is a side elevational view of the truck showing the tarp carrier arms of the automatic tarp apparatus in the raised position with the tarp partially closed.

When truck box 16 is loaded with the material, rails 27 and 28 are raised, as shown in FIG. 15, by extending linear actuators 103 and 104. This is accomplished by actuating switch 121 with the actuator handle 122. Motors 117 and 117A are operated to extend rods 111 and 111A thereby raising rails 27 and 28 to their up positions. Tarp 29 is moved rearwardly to the closed position with rails 27 and 28 raised. Tarp 29 is free to move over the top of a dump load as rails 27 and 28 are above the elevation of the top of the material. The opposite edges of the tarp are also above side boards 22 and 23. Tarp 29 is moved by operating switch 74 to energize motor 63 and thereby rotate shaft 47 in a counterclockwise direction to turn the spools 61 and 62 which pull the bottom runs of cables 83 and 101 and thereby pull slides 42 an 43 rewardly along rails 27 and 28. Slides 42 and 43 continue to move in a rearward direction until they engage end members 76 and 102. This procedure is shown in FIGS. 16 and 17.

Figure 17:
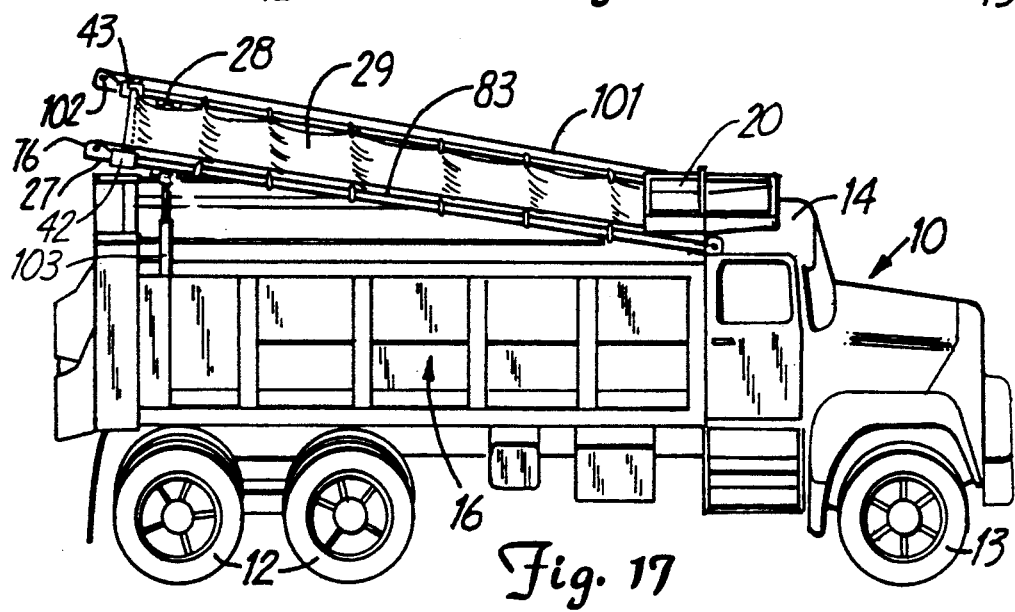
FIG. 17 is a side elevational view of the truck of FIG. 1 showing the tarp carrier arms of the automatic tarp apparatus in the raised position with the tarp in the full closed position prior to the lowering of the tarp on the truck box as shown in FIGS. 1 and 2.

When tarp 29 is in its full rearward position, as shown in FIG. 17, lift units 103 and 104 are returned to their retracted positions. Rails 27 and 28 are moved downwardly to their down positions adjacent the outsides of side boards 22 and 23. Tarp 29 is retained in engagment with the tops of side boards 22 and 23 thereby confining the load of material within box 16.

The reverse procedure is used to uncover the load. Lift units 103 and 104 are extended to raise rails 27 and 28. Tarp 29 can then be retracted to the open position, as seen in FIG. 3. Once tarp 29 is in the open position rails 27 and 28 are then moved back to their down positions. This is achieved by retracting lift units 103 and 104. The entire operation is done by the operator within cab 14. The operator remains in the safe environment of cab 14. The operator moves switch handles 74 and 122 to control the movement of tarp 29 along rails 27 and 28 and the operation of lift units 103 and 104.

Figure 20:
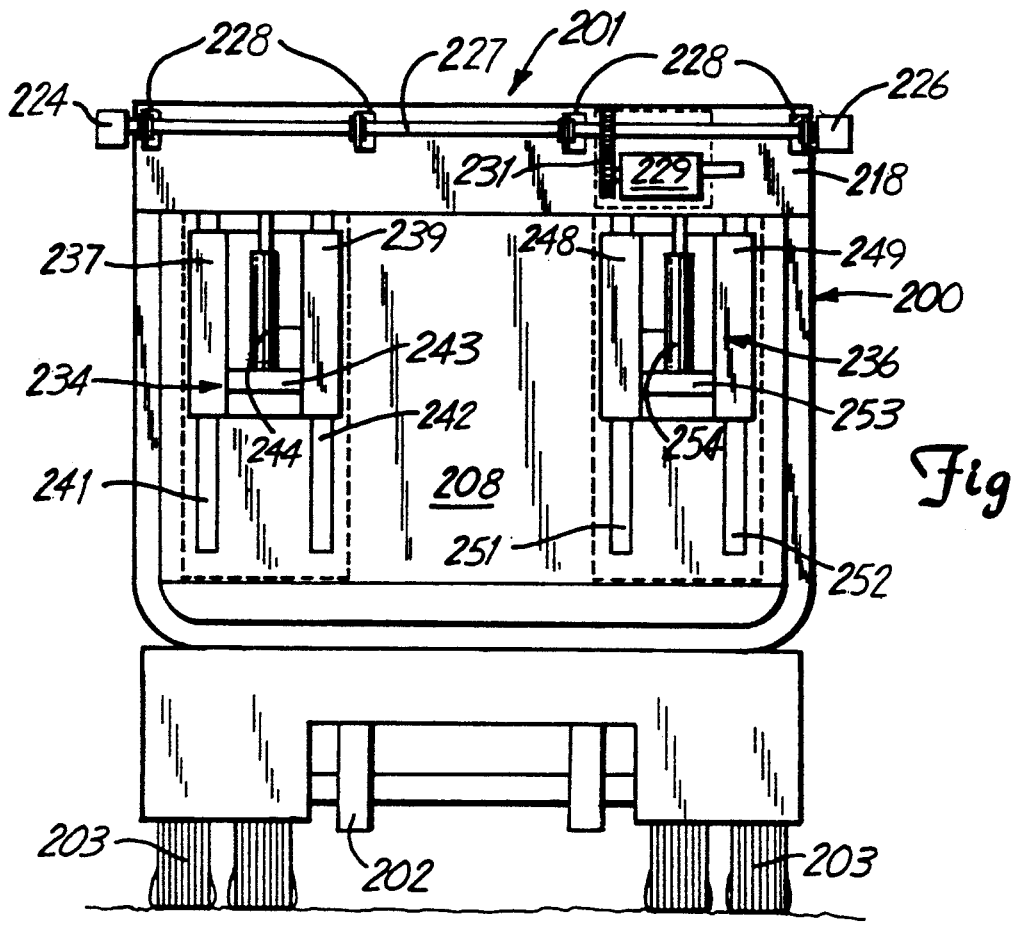
FIG. 20 is a front elevational view of the trailer and tarp apparatus of FIG. 18.

Referring to FIGS. 18, 19, and 20, there is shown a modification of the automatic tarp apparatus of the invention indicated generally at 201. The tarp apparatus 201 is employed on a trailer box indicated generally at 200, shown as an open top semi-truck trailer box.

Trailer 200 has a horizontal frame 202 supporting front and rear wheels 203 and 204. Upright side walls 206 and 207 are joined to an upright front wall 208. The rear of the trailer is closed with a rear end gate 209. Other wall structures can be used for the trailer. The trailer can have other structures such as a fifth wheel arrangement adapted to be mounted on a tractor. The trailer has a relatively long box which can be 30 or more feet in length. Walls 206-209 surround a chamber or cargo space 211 for accommodating a load of bulk material, such as grain, road materials, soil, sand, and the like. Other types of products can be transported with trailer 200.

Figure 21:
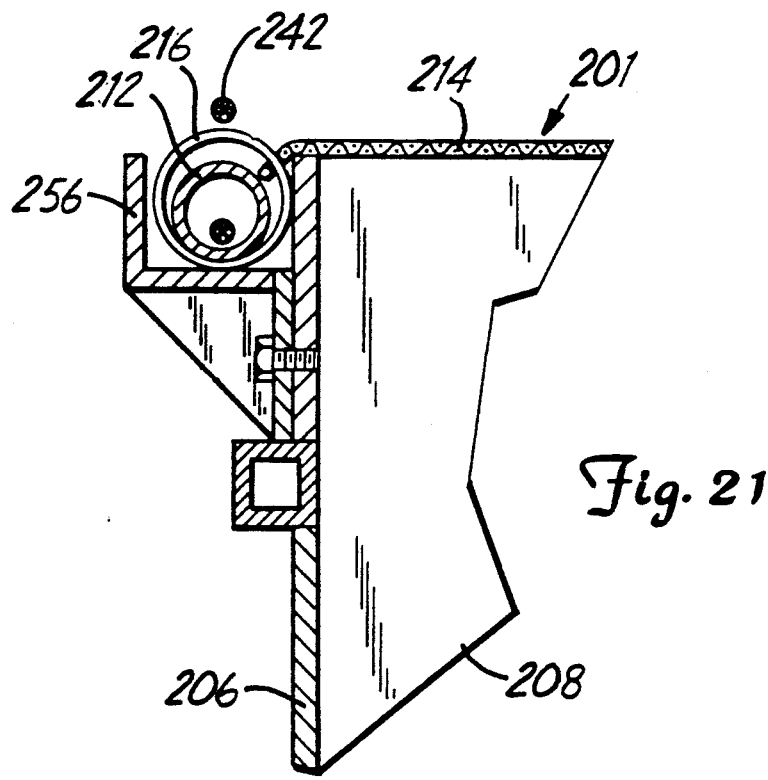
FIG. 21 is an enlarged sectional view taken along line 21—21 of FIG. 18.

Automatic tarp apparatus 201 has a pair of linear rails or arms 212 and 213 extended adjacent the tops of side walls 206 and 207. A tarp 214 of flexible canvas, fabric or plastic is slideably mounted on each of the rails 212 and 213. As shown in FIGS. 18, 19, and 21, tarp 214 is slideably mounted on rails 212 and 213 with rings 216 and 217, as such as stainless steel rings, extended through grommets in the opposite side edges of tarp 214. FIG. 18 shows tarp 214 in the closed position over the top of the box. Rails 212 and 213 are in their down positions to hold tarp 214 into enagement with the top edges of to confine the material to chamber 211 side walls 206 and 207. Tarp 214 is moved from the closed position to the open position, as shown in FIG. 19, to expose the open top of the box to allow the load to be placed in the box. The front edge of tarp 214 is secured to the top of transverse plate 218 with fasteners (not shown). Other structures can be used to secure the tarp to plate 218.

Figure 23:
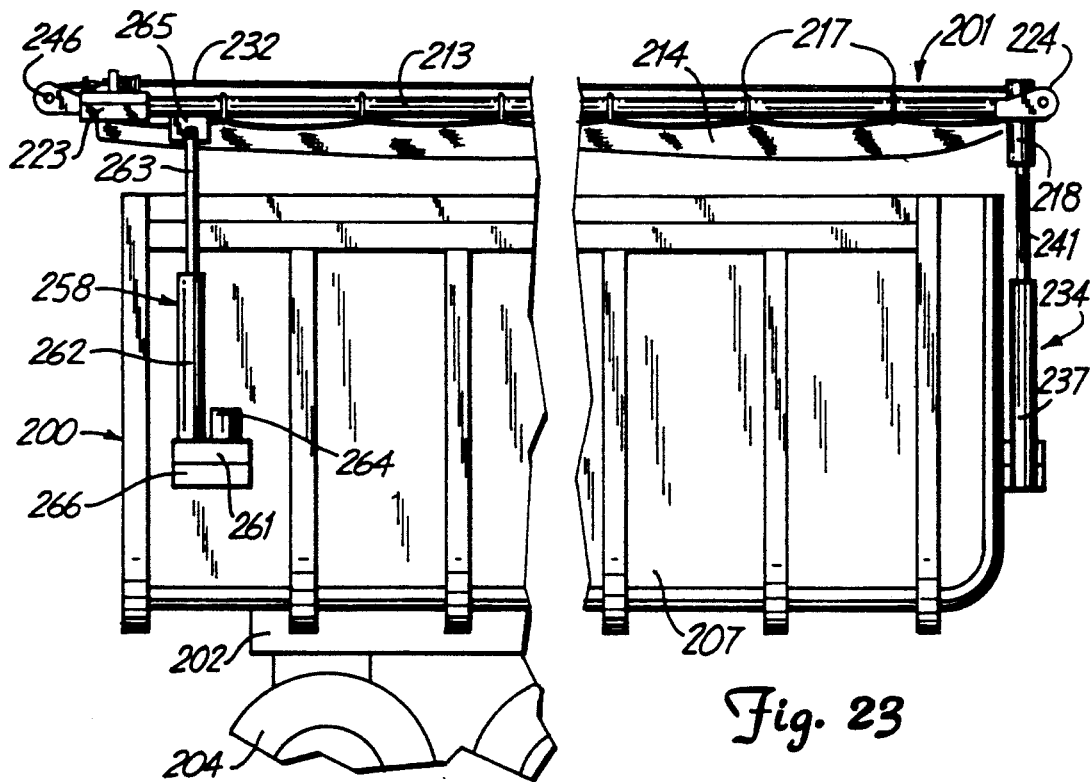
FIG. 23 is an enlarged and foreshortened side elevational view of the trailer and tarp apparatus in the raised and closed positions.
Figure 24:
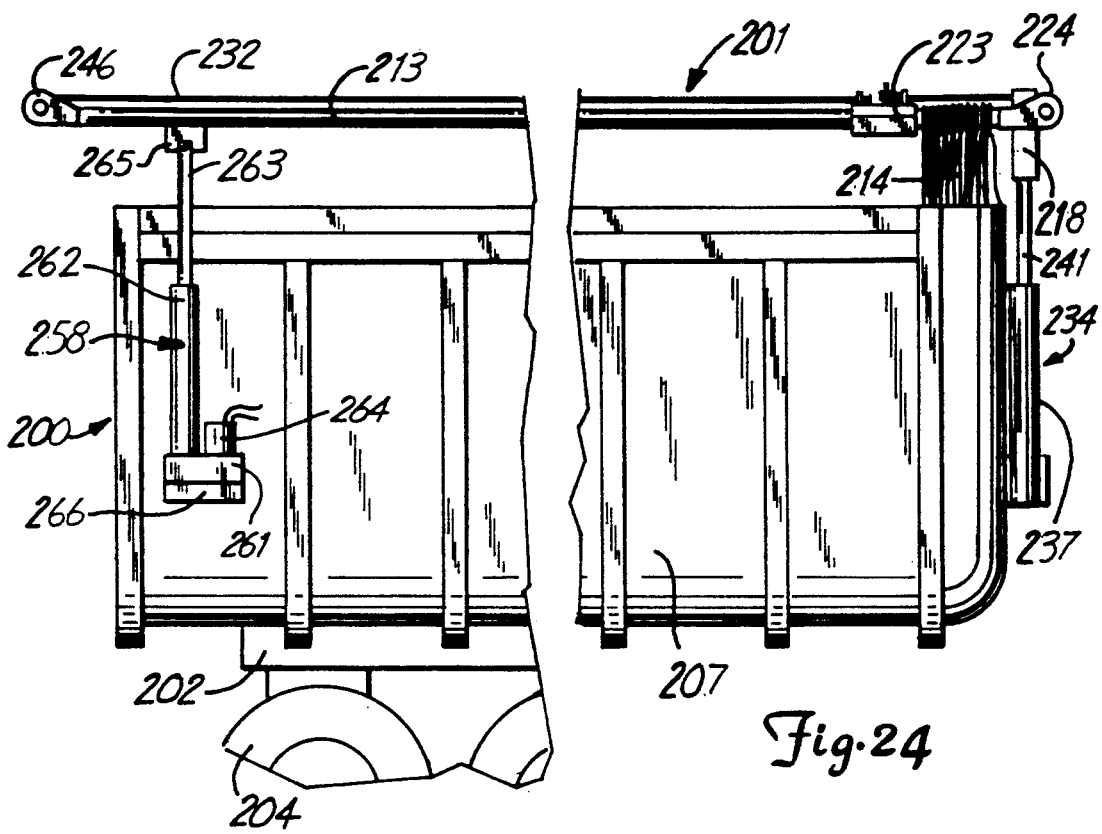
FIG. 24 is an enlarged and foreshortened side elevational view of the trailer and top apparatus in the raised and open positions.

As shown in FIGS. 19, 23, and 24, the rear end of tarp 214 has a fold or loop 219 that accommodates a transverse rod 221. Rod 221 is located within fold 219 along the transverse rear edge of tarp 214. Opposite ends of rod 221 are attached with bolts to slides 222 and 223 slideably located on the rails 212 and 213. Slides 222 and 223 have the same structure as slides 42 and 43 as shown in FIGS. 7 and 8. The forward ends of rails 212 and 213 are joined to connectors 224 and 226 secured to opposite ends of a transverse drive shaft 227. As seen in FIG. 21, a plurality of brackets 228 containing bearings rotatably support transverse drive shaft 227 on a transverse plate 218. Power is transmitted to drive shaft 227 from a DC electric motor 229 through a chain and sprocket drive 231. Motor 229 is mounted on the front of plate 218. A cover 238, shown in broken lines, encloses the motor 229 and chain and sprocket drive 231.

Connectors 224 and 226 have drive spools (not shown) secured to shaft 227 to accommodate cables 232 and 233 that extend to the rear ends of arms 212 and 213. Cables 232 and 233 are trained over idler spools (not shown) rotatably mounted on the end members 246 and 247 attached to arms 212 and 213. Cables 232 and 233 are also connected to slides 222 and 223 so that on operation of motor 229 the tarp 214 is moved between its open and closed positions. Motor 229 is a reversible DC electric motor controlled by a switch located in the cab of the vehicle. This allows the operator to selectively open and close tarp 214 from the cab of the vehicle. Motor 229 can be a gear head electric motor mounted on plate 218 and connected to shaft 227 to selectively rotate shaft 227 in opposite directions to move the tarp to open and closed positions. Other types of motors, such a hydraulic and air motors can be used to turn shaft 227.

As shown in FIG. 20, plate 218 is located in front of the front wall 208 of the trailer. A pair of lift assemblies located generally at 234 and 236 hold plate 218 adjacent front wall 208 and operate to selectively raise and lower plate 218 thereby moving the front end of tarp 214 to up and down positions relative to the trailer box.

Figure 22:
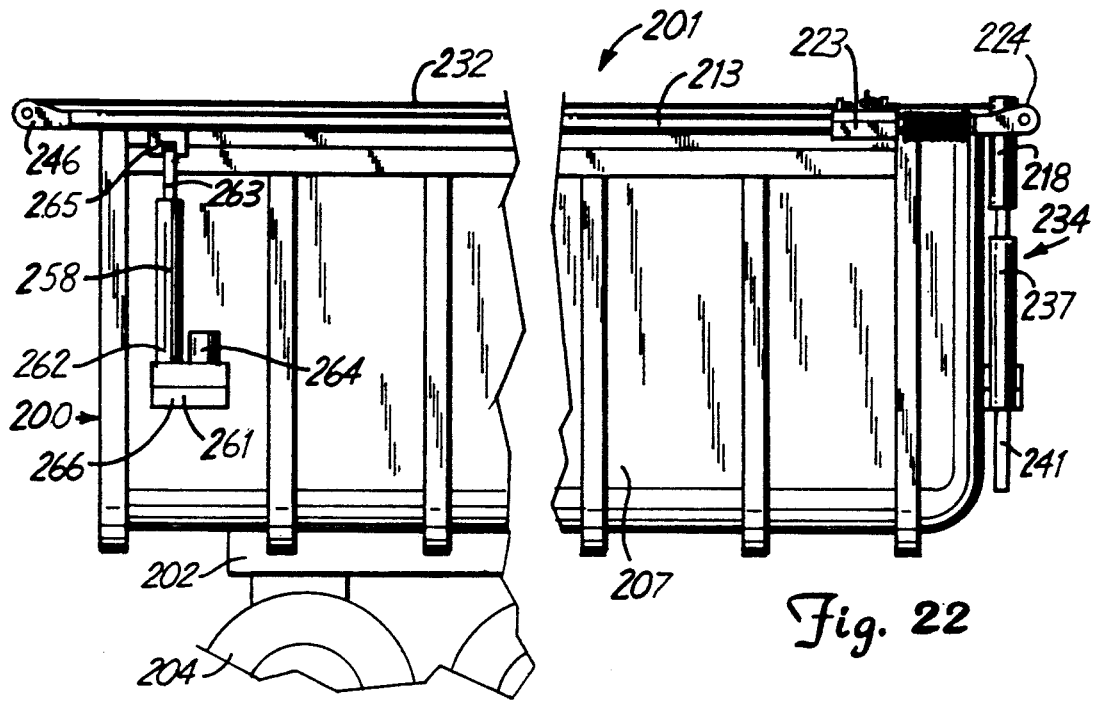
FIG. 22 is an enlarged and foreshortened side elevational view of the trailer and tarp apparatus of FIG. 19.

Lift assembly 234 has a pair of upright tubular members 237 and 239 secured to front wall 218. The pair of rods 241 and 242 slideably located in tubular members 237 and 239 have upper ends secured to one side of the plate 218. A cross beam 243 is secured to the lower ends the tubular members 237 and 239. A linear actuator 244 is located between tubular members 237 and 239 and supported on the bottom cross beam 243. Linear actuator 244 extends upwardly and is connected to plate 218. Linear actuator 244 has a reversible DC electric motor operable to selectively extend or retract the linear actuator. Lift assemblies 234 and 236 have linear actuators that concurrently operate to move plate 218 between its up or raised position and its lower or down position as shown in FIGS. 22 and 23.

Returning to FIG. 20, lift assembly 236 is identical in structure to lift assembly 234. Lift assembly 236 has a pair of upright tubular members 248 and 249 secured to front wall 208. A pair of upright rods 251 and 252 are slideably located in tubular members 248 and 249 secured to front wall 208. A pair of upright rods 251 and 252 are slideably located in tubular members 248 and 249. The upper ends of rods 251 and 252 are secured to plate 218. A cross beam 253 is secured to the lower ends of tubular members 248 and 249. A linear actuator 254 located between tubular members 248 and 249 is mounted on cross beam 253 and connected to plate 218. Linear actuator 254 has a reversible DC electric motor that operates to selectively extend and contract the actuator. The electric motors of actuators 244 and 254 are connected through suitable switches to a control located within the cab of the vehicle. This allows the operator of the vehicle to selectively operate the linear actuators 244 and 254 to raise or lower plate 218 thereby raising or lowering the front of tarp relative to the top of trailer 200. Rails 212 and 213 extend rearwardly adjacent the opposite sides of the box. When arms 212 and 213 are in their down positions they rest on brackets 256 and 257. As seen in FIG. 19, rear selections of arms 212 and 213 are connected to lift units 258 and 259 secured to the rear portions of the side walls 206 and 207. Lift units 258 and 259 are linear actuators each having a gear box 261 connected to an upright tube 262. An upright rod 263 is slideably disposed in tube 262 and operates to extend and contract the linear lift unit 258. An electric motor 264 mounted on gear box 261 operates to selectively extend or contract the linear lift unit 258. The linear lift unit 258 is mounted on a support 266 secured to side wall 207. A second support (not shown) can be attached to the upper end of tube 262 to hold lift unit 258 in vertical alignment on the rear portion of the box. Lift unit 259 has the same structure as lift unit 258 and operates to raise and lower rail 212.

Figure 25:
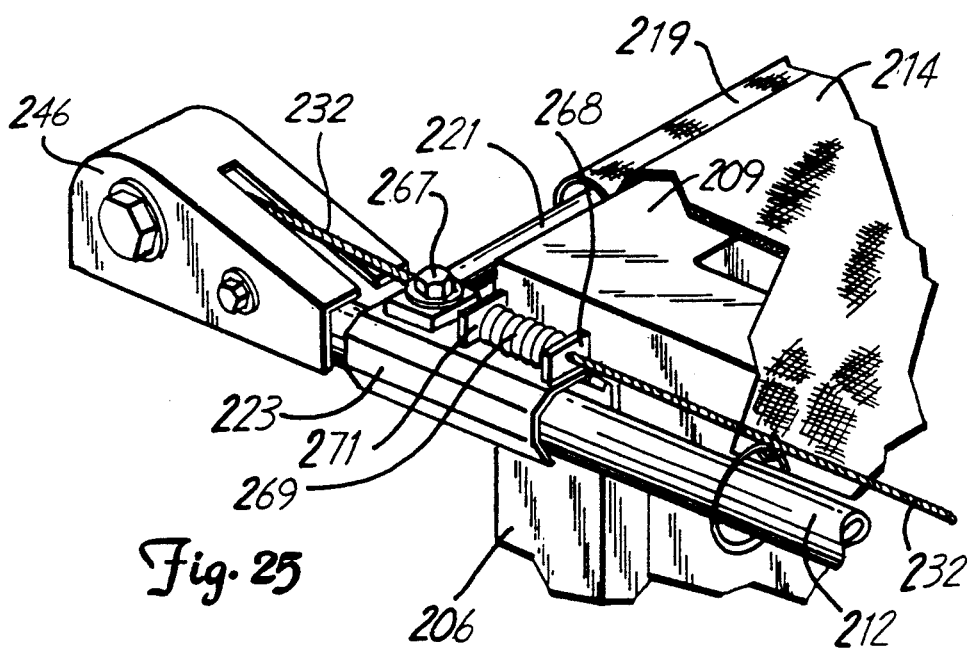
FIG. 25 is an enlarged perspective view of the rear end of the tarp assembly in the closed position.

Slides 222 and 223 positioned about rails 212 and 213 are identical to slides 42 and 43 as shown in FIGS. 7, 8, and 9. As shown in FIG. 25, slide 223 is a generally inverted U-shaped channel member that fits over the top and side portions of rail 212. Bearing pads (not shown) are secured to the inside portions of slide 223 to facilitate the sliding on rail 212. A transverse rod 221 located within a loop 219 in the rear end of tarp 214 is secured to slides 223 and 222 with bolts 267. Cable 232 is also secured to bolt 267. The opposite end of cable 242 projects through an ear 268 and a spring 269. A washer 254 bears against a nut operatively connected to a bolt (not shown) attached to cable 232 to adjust the tension on cable 232.

In operation, linear actuators 244 and 254 and lift units 258 and 259 operate to raise rails 212 and 213 above the top of the side walls of the box 200, as shown in FIG. 23. This raises the entire tarp 214 above the top of box 200. Motor 229 is then operated to rotate shaft 227. Cables 232 and 233 being trained about the drive pulleys pull tarp 214 to the open position adjacent the front of the box. The linear actuators 244 and 254 and lift units 258 and 259 are then retracted to lower rails 212 and 213. The box can then be loaded with bulk materials as rails 212 and 213 are adjacent the sides of the box. When box 200 is full of material, the linear actuators 244 and 254 and lifts 258 and 259 are operated to raise rails 212 and 213. Motor 229 is then operated to move tarp 214 to the closed position as shown in FIG. 23. The tarp 214 being located above the box and the material is free to be moved to its closed position. The linear actuators 244 and 254 and lift units 258 and 259 are then operated to lower rails 212 an 213 and thereby move tarp 214 downwardly into engagement with the top edges of the side and end walls of the trailer box thereby completely covering the material within the box. The linear actuators 244 and 254 and lift units 258 and 259 also function as holding or retaining structures for the tarp as they do not extend nor contract unless they are operated with their electric motors. Other types of linear extendible and contractible members such as air cylinders, hydraulic fluid cylinders, hand turned screws and the like can be used to selectively raise and lower rails 212 and 213.

While there has been shown and described preferred embodiments of the automatic tarp apparatus of the invention it is understood that changes in the structure, arrangement of the structure and parts can be made by those skilled in the art without departing from the invention. This invention is defined in the following claims:

I claim:

1. An apparatus for covering an open top structure comprising: tarp means having opposite sides and a size to cover the open top of the structure, first and second rail means for supporting the tarp means for movement between an open position and a closed position relative to open top of the structure, means connecting the opposite sides of the tarp means to the first and second rail means to allow the tarp means to move between the open and closed positions, means for moving the tarp means along the first and second rail means selectively to said open and closed positions relative to the open top of the structure, a transverse shaft, means mounting the shaft on the structure, said means for moving the tarp means along the first and second rails means includes pulleys mounted on the shaft, and cable means trained about the pulleys and connected to the tarp means, and means operable to rotate the shaft thereby moving the tarp means relative to the first and second rail means to said open and closed positions, means mounting the first and second rail means on the shaft for movement between up positions and down positions, and means connected to the first and second rail means and structure operable to move the first and second rail means to up positions and down positions, said tarp means being moved to said open and closed positions when the first and second rail means are in the up positions and said first and second rail means being moved to the down positions when the tarp means is in the closed position thereby closing the open top of the structure.

2. The apparatus of claim 1 wherein: the open top structure is a box having upright sidewalls with longitudinal top edges and a front wall, said first rail means being located adjacent one top edge of one sidewall, said second rail means being located adjacent the other top edge of the other sidewall, said means mounting the first and second rail means on the structure including pivot means mounting the first and second rail means on the shaft, said means connected to the first and second rail means being operable to pivot the first and second rail means to up positions above the top edges of the sidewalls and to down positions adjacent the sidewalls to hold the tarp means in engagement with said top edges.

3. The apparatus of claim 2 wherein: the means connecting the opposite sides of the tarp means to the first and second rail means include a plurality of connectors attached to the tarp means and extended around the first and second rail means.

4. The apparatus of claim 1 wherein: the means connected to the first and second rails means operable to move the first and second rails means to up positions and down positions includes extendible and contractible lift units mounted on the structure and connected to the first and second rail means.

5. An apparatus for covering an open top structure comprising: tarp means having opposite sides and a size to cover the open top of the structure, first and second rail means for supporting the tarp means for movement between an open position and a closed position relative to the open top of the structure, means connecting the opposite sides of the tarp to the first and second rail means, means for moving the tarp means along the first and second rail means to open and closed positions relative to the open top of the structure, means mounting the first and second rail means on the structure for movement between up positions and down positions, and means connected to the first and second rail means operable to move the first and second rail means to up positions and down positions, said tarp means being moved to said open and closed positions when said first and second rail means are int he up positions and said first and second rail means being moved to the down positions when the tarp means is in the closed position thereby closing the open top of the structure, said open top structure being a box having upright side walls with longitudinal top edges and a front wall, said first rail means being located adjacent one top edge of one side wall, said second rail means being located adjacent the other top edge of the other side wall, said means mounting the first and second rail means on the structure including pivot means mounting the first and second rail means on the front wall of the box, said means connected to the first and second rail means being operable to pivot the first and second rail means to up positions above the top edges of the sidewalls to down positions adjacent the side walls to hold the tarp means in engagement with said top edges, said pivot means includes a transverse shaft, means mounting the shaft on the front wall of the box, means pivotally mounting the first and second rail means on said shaft, the means for moving the tarp means along the first and second rail means includes pulleys mounted on the shaft in alignment with the first and second rail means, slides movably mounted on the first and second rail means, means connecting the slides to the tarp means, cable means connected to the slides and trained about the pulleys, and motor means operable to rotate the shaft thereby moving the slides along the first and second rails means to move the tarp to the open and closed positions.

6. The apparatus of claim 5 wherein: the means connected to the first and second rail means operable to move the first and second rail means include extendible and contractible lift units mounted on the sidewalls and connected to the first and second rail means.

7. The apparatus of claim 6 wherein: the lift units have second motor means operable to extend and contract said lift units thereby pivoting the first and second rail means to up and down positions, and control means for the first and second motor means to allow an operator to selectively operate said first and second motor means to control the up and down positions of the first and second means and the open and closed positions of the tarp means.

8. The apparatus of claim 5 including: guide members mounted on the first and second rail means for maintaining the cable means in engagement with said pulleys.

9. An apparatus for covering an open top structure comprising: tarp means having opposite sides and a size to cover the open top of the structure, first and second rail means for supporting the tarp means for movement between an open position and a closed position relative to the open top of the structure, means connecting the opposite sides of the tarp to the first and second rail means, means for moving the tarp means along the first and second rail means to open and closed positions relative to the open top of the structure, means mounting the first and second rail means on the structure for movement between up positions and down positions, and means connected to the first and second rail means operable to move the first and second rail means to up positions and down positions, said tarp means being moved to said open and closed positions when said first and second rail means are in the up positions and said first and second rail means being moved to the down positions when the tarp means is in the closed position thereby closing the open top of the structure, the first and second rail means each having front portions and rear portions, the means mounting the first and second rail means on the structure for movement between up and down positions including first lift means mounted on the structure connected to front portions of the rail means and second lift means mounted on the structure connected to rear portions of the rail means, said first and second lift means operable to move the first and second rail means and tarp means connected thereto to up and down positions relative to the structure.

10. The apparatus of claim 9 wherein: said first and second lift means comprise extendible and contractible units having motors for operating the units.

11. The apparatus of claim 9 wherein: the means for moving the tarp means along the first and second rail means includes a shaft, support means connected to the first lift means for rotatably supporting the shaft, pulleys mounted on the shaft in alignment with the first and second rail means, slides moveably mounted on the first and second rail means, means connecting the slides to the tarp means, cable means connected to the slides and trained about the pulleys, and motor means operable to rotate the shaft thereby moving the slides along the first and second rail means to move the tarp means to the open and closed positions.

12. The apparatus of claim 11 including: guide members mounted on the first and second rail means for maintaining the cable means in engagement with the pulleys.

13. The apparatus of claim 9 wherein: said first and second lift means comprise extendible and contractible units having first motors for operating the units, said means for moving the tarp means along the first and second rail means having a second motor operable to move the tarp means.

14. The apparatus of claim 13 wherein: the means for moving the tarp along said rail means includes a shaft, support means connected to the first lift means for rotatably supporting the shaft, drive means connecting the shaft to the second motor whereby the second motor operates to rotate the shaft, pulleys mounted on the shaft in alignment with the first and second rail means, means connecting the slides to the tarp means, and cable means connected to the slides and trained about the pulleys whereby on operation of the second motor the tarp means is moved to the open and closed positions.

15. The apparatus of claim 14 wherein: the support means includes a plate, means rotatably mounting the shaft on the plate, and guide means mounted on the structure and connected to the plate to guide the plate for movement in up and down directions, said first lift means being connected to said plate.

16. An apparatus for covering an open top truck box having upright sidewalls, a transverse front wall, and a chamber for accommodating material comprising: a tarp having a length and width greater than the length and width of the open top of the box and opposite sides, a first rail located adjacent one side of the tarp, a second rail located adjacent to the other side of the tarp, means connecting the opposite sides of the tarp to the first and second rails to allow the tarp to be moved to open and closed positions relative to the open top of the box, a transverse shaft located adjacent the front wall of the box, means mounting the shaft for rotation on the front wall of the box, means mounting the first rail and second rail on the shaft to allow the first and second rails to move to up and down positions relative to the side walls of the box, first pulleys secured to the shaft in alignment with the first and second rails, idler pulleys mounted on the first and second rails remote from the first pulleys, slides movably mounted on the first and second rails, means connecting the slides to the tarp, cable means connected to the slides and trained about said pulleys, first motor means driveably connected to said open top of the box, extendible and contractible lift units mounted on the side walls of the box and connected to the first and second rails operable to move the first and second rails and tarp connected thereto to up and down positions, said lift units having second motor means operable to selectively extend and contract said lift units thereby moving said rails to up and down positions, and control means of said first and second motors to allow an operator to operate said motors to control the up and down positions of the rails and the open and closed positions of the tarp.

17. The apparatus of claim 16 including: guide members mounted on the first and second rails for maintaining the cable means in engagement with said pulleys.

18. The apparatus of claim 16 including: means mounted on the slides for maintaining tension on the cable means.

19. The apparatus of claim 16 wherein: the means connecting the opposite sides of the tarp to the first and second rails include a plurality of connectors attached to the tarp and extended around the first and second rails.

20. An apparatus for covering an open top trailer box having upright side walls, a transverse front wall, and a chamber for accommodating material comprising a tarp having a length and width greater than the length and width of the open top of the box opposite sides, a first rail located adjacent one side of the tarp, a second rail located adjacent to the other side of the tarp, means connecting the opposite sides of the tarp to the first and second rails to allow the tarp to be moved to open and closed positions relative to the open top of the box, a transverse shaft adjacent the front wall of the box, support means rotatably supporting the shaft, first lift means having first motor means connected to the support means and front wall operable to selectively raise and lower the support means, means mounting the first and second rails on the shaft whereby the rails move up and down with the support means, first pulleys secured to the shaft in alignment with the first and second rails, idler pulleys mounted on the first and second rails remote from the first pulleys, slides movably mounted on the first and second rails, means connecting the slides to the tarp, cable means connected tot he slides and trained about said pulleys, second motor means mounted on the support means and being driveably connected to said first and second rails and moving the tarp to the open and closed positions relative to the open top of the box, and second lift means having third means operable to selectively extend and contract the second lift means mounted on the side walls of the box and connected to the first and second rails.

21. The apparatus of claim 20 including: guide members mounted on the first and second rails for maintaining the cable means in engagement with said pulleys.

22. The apparatus of claim 20 including: means mounted on the slides for maintaining tension on the cable means.

23. The apparatus of claim 20 including: the means connecting the opposite sides of the tarp to the first and second rails include a plurality of connectors attached to the tarp and extended around the first and second rails.

* * * * *